(12) United States Patent
Wang et al.

(10) Patent No.: US 11,756,526 B2
(45) Date of Patent: Sep. 12, 2023

(54) ACTIVE SOUND EFFECT GENERATING DEVICE

(71) Applicant: HONDA MOTOR CO., LTD., Tokyo (JP)

(72) Inventors: Xun Wang, Wako (JP); Toshio Inoue, Wako (JP); Takuma Maesaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/579,867

(22) Filed: Jan. 20, 2022

(65) Prior Publication Data

US 2022/0238094 A1 Jul. 28, 2022

(30) Foreign Application Priority Data

Jan. 22, 2021 (JP) .................................. 2021-008744

(51) Int. Cl.
*H04R 1/02* (2006.01)
*G10K 15/02* (2006.01)
*B60Q 9/00* (2006.01)
(52) U.S. Cl.
CPC ............... *G10K 15/02* (2013.01); *B60Q 9/00* (2013.01); *H04R 1/025* (2013.01); *H04R 2499/13* (2013.01)

(58) Field of Classification Search
CPC .......... G10K 15/02; B60Q 9/00; H04R 1/025; H04R 2499/13
USPC .......................................................... 381/86
See application file for complete search history.

(56) References Cited

U.S. PATENT DOCUMENTS

2015/0353007 A1* 12/2015 Inoue ..................... G10K 15/02
903/902
2019/0228759 A1* 7/2019 Wang ....................... B60Q 5/00

FOREIGN PATENT DOCUMENTS

JP 2019-128378 A 8/2019

* cited by examiner

*Primary Examiner* — Sean H Nguyen
(74) *Attorney, Agent, or Firm* — Carrier, Shende & Associates P.C.; Joseph P. Carrier; Fulchand P. Shende

(57) ABSTRACT

An active sound effect generating device includes a tone adjusting unit for setting a plurality of different sub-fundamental frequencies by multiplying a fundamental frequency by coefficients, a first tone signal generating unit, a second tone signal generating unit, a third tone signal generating unit, and a fourth tone signal generating unit for generating tone signals corresponding to the respective sub-fundamental frequencies, and a sound effect signal generating unit for generating a sound effect signal for outputting sound effects from a speaker based on the tone signals.

4 Claims, 13 Drawing Sheets

_(1)_

ACTIVE SOUND EFFECT GENERATING DEVICE

CROSS-REFERENCE TO RELATED APPLICATIONS

This application is based upon and claims the benefit of priority from Japanese Patent Application No. 2021-008744 filed on Jan. 22, 2021, the contents of which are incorporated herein by reference.

BACKGROUND OF THE INVENTION

Field of the Invention

The present invention relates to an active sound effect generating device.

Description of the Related Art

JP 2019-128378 A discloses an active sound effect generating device. The active sound effect generating device generates a plurality of ordered acoustic signals. Each of the ordered acoustic signals is an acoustic signal of an ordered frequency of a fundamental frequency set according to a vehicle speed. The active sound effect generating device generates an acoustic signal of a sound effect by adding a plurality of generated ordered acoustic signals.

SUMMARY OF THE INVENTION

In order to make the sound effect harmonic, it is necessary to set the ratio of each ordered frequency to a predetermined value. For this reason, there is a problem in that the degree of freedom of tone adjustment of sound effects is low and characteristic sound effects cannot be generated.

An object of the present invention is to solve the aforementioned problem.

According to one aspect of the present invention, an active sound effect generating device generates a sound effect in a vehicle compartment of a vehicle, and includes a vehicle speed acquisition unit configured to acquire a vehicle speed, a fundamental frequency setting unit configured to set a fundamental frequency that changes in accordance with the acquired vehicle speed, a tone adjusting unit configured to set a plurality of different sub-fundamental frequencies by multiplying the fundamental frequency by coefficients; tone signal generating units provided corresponding to the respective sub-fundamental frequencies, and each configured to generate a tone signal including a plurality of ordered frequency components that are obtained by multiplying each of the sub-fundamental frequencies by predetermined values, and a sound effect signal generating unit configured to generate a sound effect signal that causes a speaker to output the sound effect, based on the tone signal generated by each of the tone signal generating units.

According to the present invention, it is possible to increase the degree of freedom of tone adjustment of a sound effect.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

First Embodiment

Figure 1:
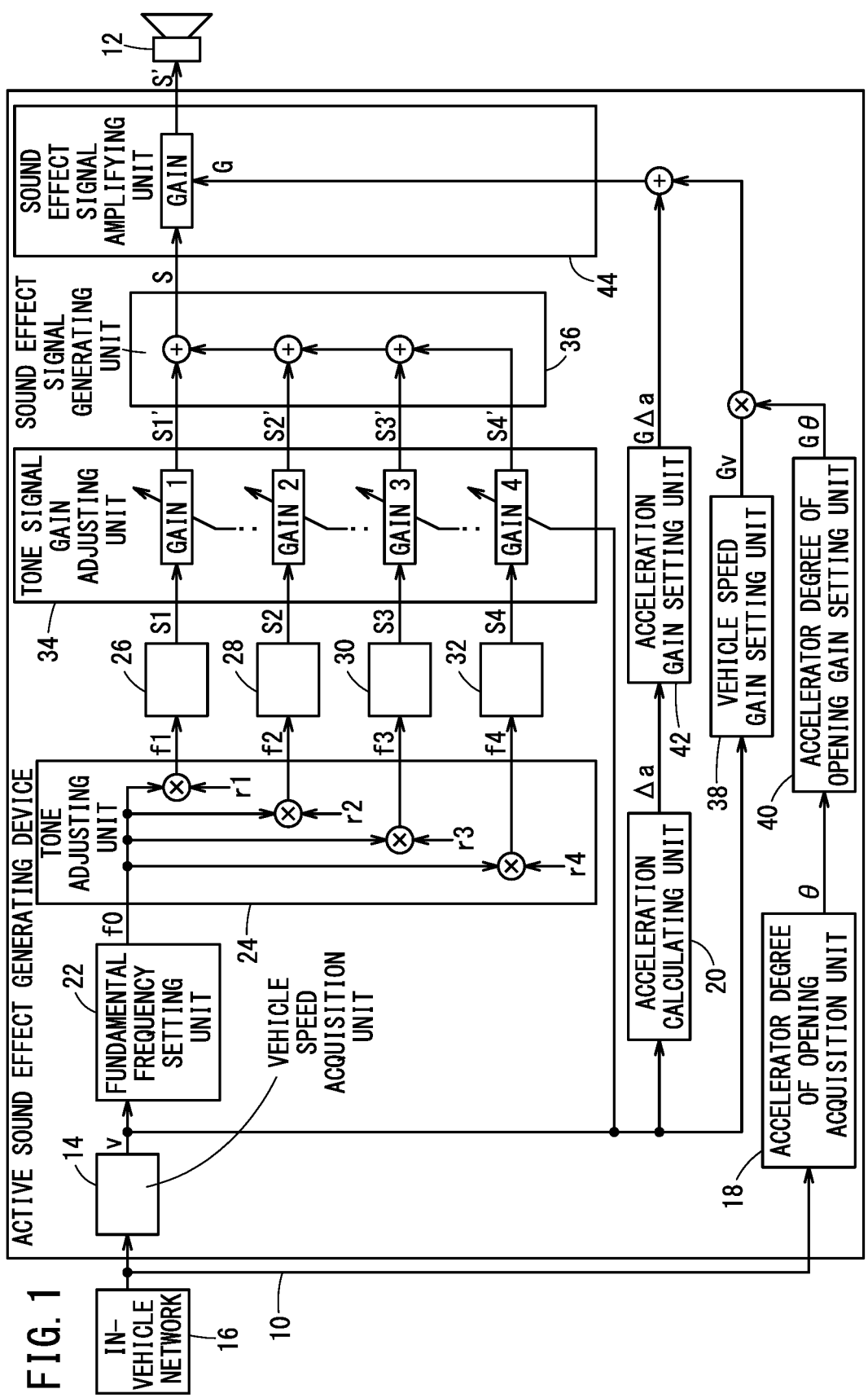
FIG. 1 is a block diagram showing a configuration of an active sound effect generating device.

FIG. 1 is a block diagram showing a configuration of an active sound effect generating device 10. The active sound effect generating device 10 is a device that causes a speaker 12 to output sound effects changing according to a vehicle speed. The speaker 12 is provided in a vehicle compartment of a vehicle such as an automobile.

The active sound effect generating device 10 includes a vehicle speed acquisition unit 14, an accelerator degree of opening acquisition unit 18, an acceleration calculating unit 20, a fundamental frequency setting unit 22, a tone adjusting unit 24, a first tone signal generating unit 26, a second tone signal generating unit 28, a third tone signal generating unit 30, a fourth tone signal generating unit 32, a tone signal gain adjusting unit 34, a sound effect signal generating unit 36, a vehicle speed gain setting unit 38, an accelerator degree of opening gain setting unit 40, an acceleration gain setting unit 42, and a sound effect signal amplifying unit 44.

The active sound effect generating device 10 includes a computer equipped with one or more operational processing devices (not shown) and one or more storage units. The operational processing device includes, for example, a processor such as a central processing unit (CPU) or a microprocessing unit (MPU), and a memory such as a ROM or a RAM. The storage unit is, for example, a recording medium such as a hard disk or a solid state drive (SSD). The active sound effect generating device 10 need not necessarily include a storage unit. In this case, the active sound effect generating device 10 may transmit and receive data to and from a storage unit on the cloud through communications. Each of the vehicle speed acquisition unit 14, the accelerator degree of opening acquisition unit 18, the acceleration calculating unit 20, the fundamental frequency setting unit 22, the tone adjusting unit 24, the first tone signal generating unit 26, the second tone signal generating unit 28, the third tone signal generating unit 30, the fourth tone signal generating unit 32, the tone signal gain adjusting unit 34, the sound effect signal generating unit 36, the vehicle speed gain setting unit 38, the accelerator degree of opening gain setting unit 40, the acceleration gain setting unit 42, and the sound effect signal amplifying unit 44, is realized by the operation processing unit executing programs stored in the storage unit.

The vehicle speed acquisition unit 14 acquires a vehicle speed v from an in-vehicle network 16 of the vehicle. The accelerator degree of opening acquisition unit 18 acquires the accelerator degree of opening θ from the in-vehicle network 16. The acceleration calculating unit 20 calculates an acceleration Aa of the vehicle from the vehicle speed v acquired by the vehicle speed acquisition unit 14.

Figure 2:
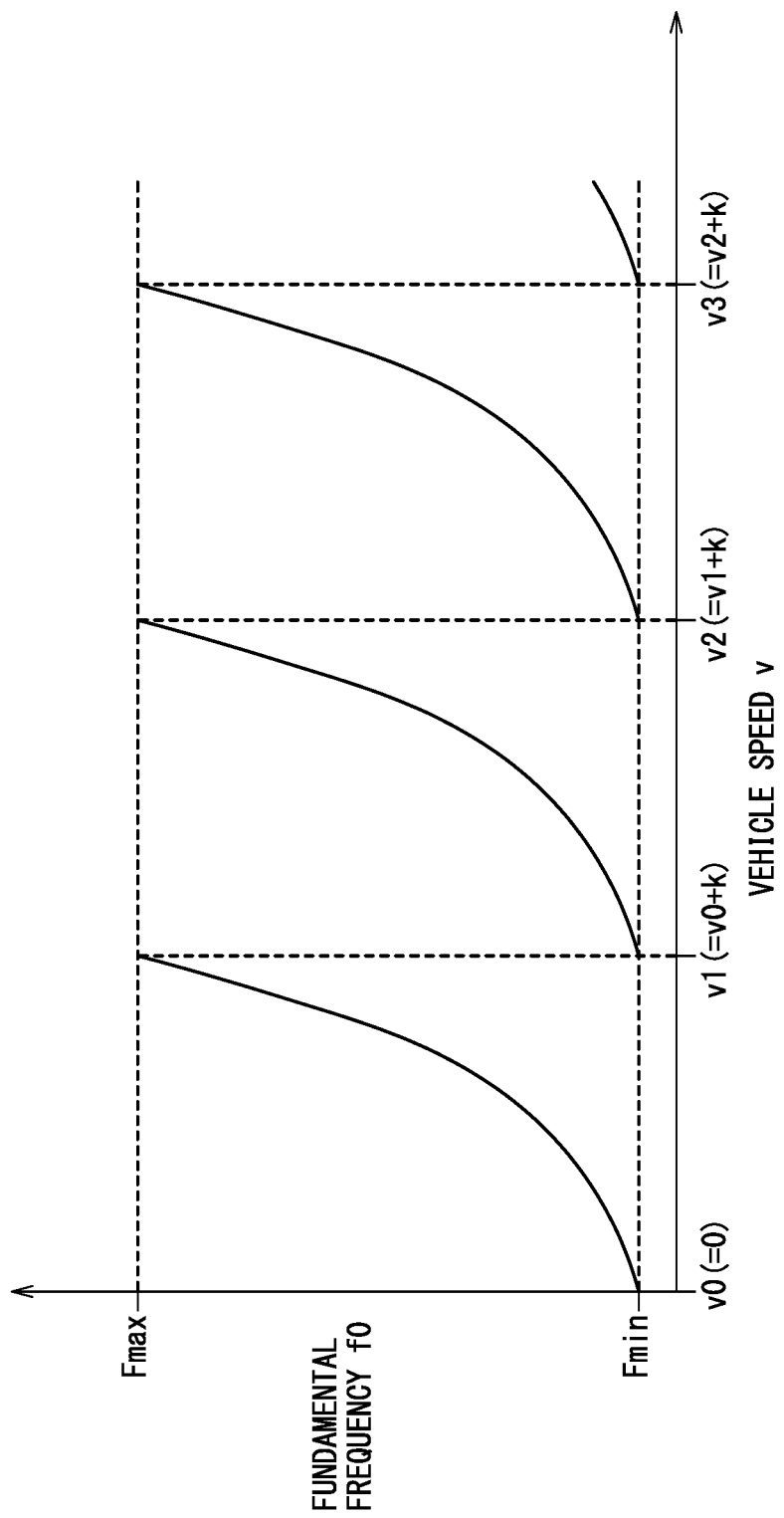
FIG. 2 is a graph showing a fundamental frequency with respect to the vehicle speed.

The fundamental frequency setting unit 22 sets a fundamental frequency f0 in accordance with the vehicle speed v. FIG. 2 is a graph showing the fundamental frequency f0 with respect to the vehicle speed v. As shown in FIG. 2, the fundamental frequency f0 is set so as to increase exponentially from a lower limit frequency Fmin to an upper limit frequency Fmax as the vehicle speed v increases. When the fundamental frequency f0 has reached the upper limit frequency Fmax, the fundamental frequency f0 is returned to the lower limit frequency Fmin. The fundamental frequency f0 is set so as to increase exponentially from the lower limit frequency Fmin to the upper limit frequency Fmax again as the vehicle speed v increases. The fundamental frequency f0 can be obtained by the following expressions.

$$f0(n) = Fmin \times \alpha^{\left(\frac{v(n) - V(n)}{k}\right)}$$

IF $f0(n) \geq Fmax$, $V(n) = v(n)$

Else if $f0(n) < Fmin$, $V(n) = v(n) - \Delta V$

Else, $V(n) = V(n-1)$ $$\Delta V(n) = k \log_a \frac{Fmax}{Fmin}$$

In the expressions, the character n denotes the number of time steps. The active sound effect generating device 10 performs signal processing in a predetermined cycle. The time step indicates a length of the cycle. The number of time steps indicates how many times the signal processing is performed. In the expression, Fmax indicates the upper limit frequency. In the expressions, Fmin indicates the lower limit frequency. In the expressions, ΔV indicates the amount of change in the vehicle speed v when the frequency changes from the lower limit frequency Fmin to the upper limit frequency Fmax. The character k indicates a frequency change rate adjusting coefficient. The character k indicates an interval of the vehicle speed at which the fundamental frequency f0 change from the lower limit frequency Fmin to the upper limit frequency Fmax. As a result, the fundamental frequency setting unit 22 can set the fundamental frequency f0 to be approximate to a Shepherd tone (or Shepherd infinite scale) that changes according to the vehicle speed.

The tone adjusting unit 24 multiplies the fundamental frequency f0 by tone setting coefficients rm (r1, r2, r3, r4 . . . ), whereby the tone adjusting unit 24 sets a plurality of different sub-fundamental frequencies fm (f1, f2, f3, f4 . . . ). In the present embodiment, the tone setting coefficients r1, r2, r3, and r4 are set to the following values.

$r1=1$ $r2=1.25$ $r3=1.5$ $r4=1.2$

The tone adjusting unit 24 multiplies the fundamental frequency f0 by the tone setting coefficients r1, r2, r3, and r4. As a result, the tone adjusting unit 24 sets four different sub-fundamental frequencies f1, f2, f3, and f4. It is sufficient that the tone adjusting unit 24 may set a plurality of different sub-fundamental frequencies fm. The number of set sub-fundamental frequencies fm need not necessarily be limited to four.

Figure 3:
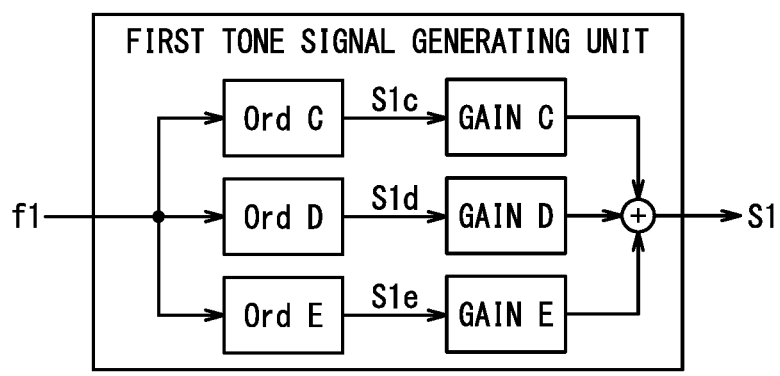
FIG. 3 is a block diagram showing a configuration of the first tone signal generating unit.

FIG. 3 is a block diagram showing the configuration of the first tone signal generating unit 26. The first tone signal generating unit 26 generates three frequency components S1c, S1d, and S1e for the sub-fundamental frequency component f1. Further, the first tone signal generating unit 26 generates the first tone signal S1 by adding the frequency components S1c, S1d, and S1e, each of which has been multiplied by the gain. The frequency component Sic is a c-th order component for the sub-fundamental frequency f1. The frequency component Sid is a d-th order component for the sub-fundamental frequency f1. The frequency component S1e is an e-th order component for the sub-fundamental frequency component f1. The c-th order, d-th order and e-th order are power values having the same base α. In the present embodiment, the c-th order is $\alpha^0$-th, i.e., the 1-th order. The d-th order is $\alpha^1$-th, i.e., a-th order. The e-th order is $\alpha^2$-th order. Here, the character "^" indicates a power.

Figure 4:
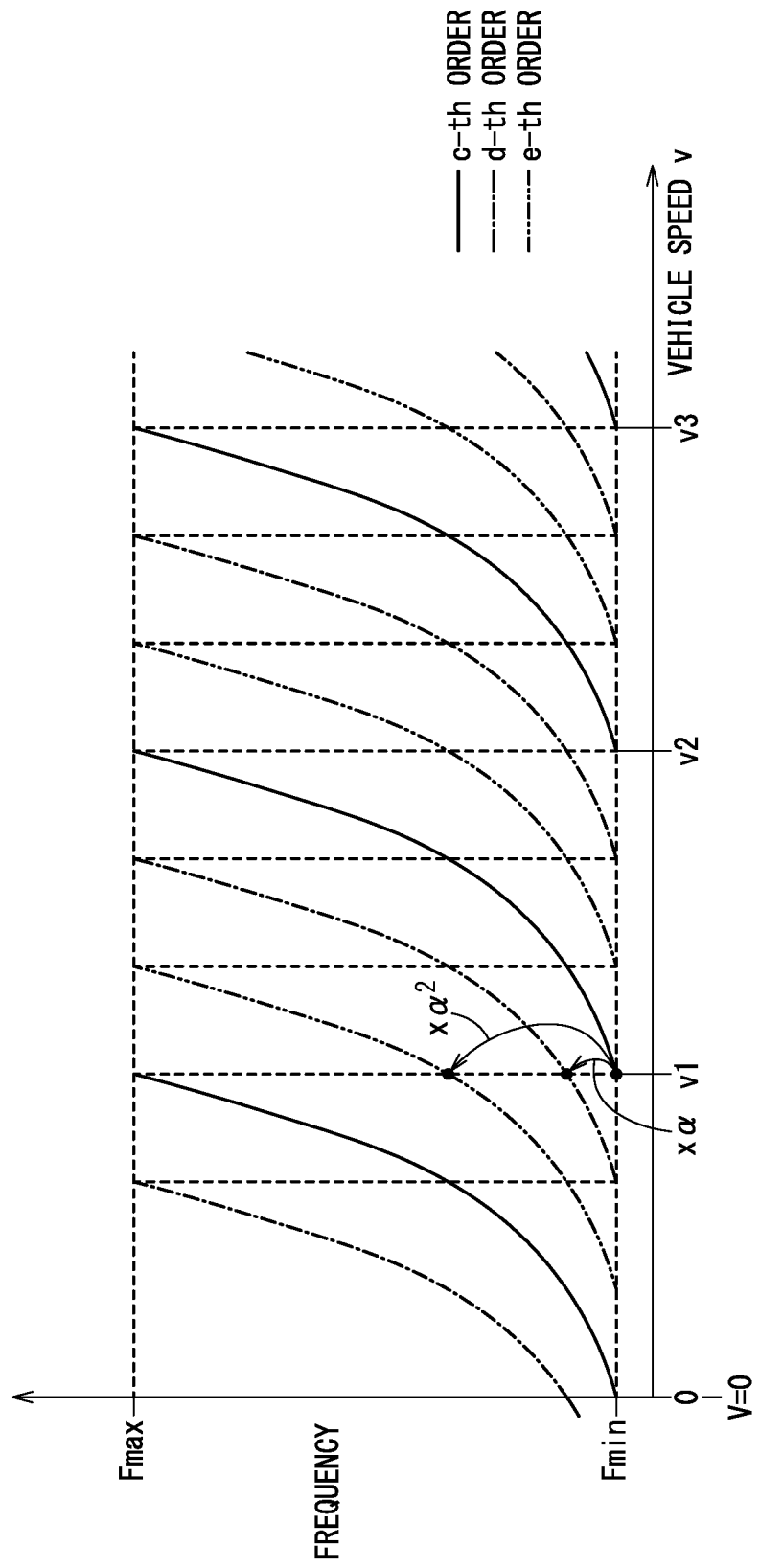
FIG. 4 is a graph showing the change of each ordered frequency with respect to the speed.

FIG. 4 is a graph showing changes of the c-th, d-th, and e-th frequencies for the sub-fundamental frequency f1, with respect to the vehicle speed v. For example, when the vehicle speed v is v1, the d-th order frequency is α times the c-th order frequency, and the e-th order frequency is $\alpha^2$ times the c-th order frequency. For example, when α=2, the sound of the first tone signal S1 can be harmonized.

Figure 5:
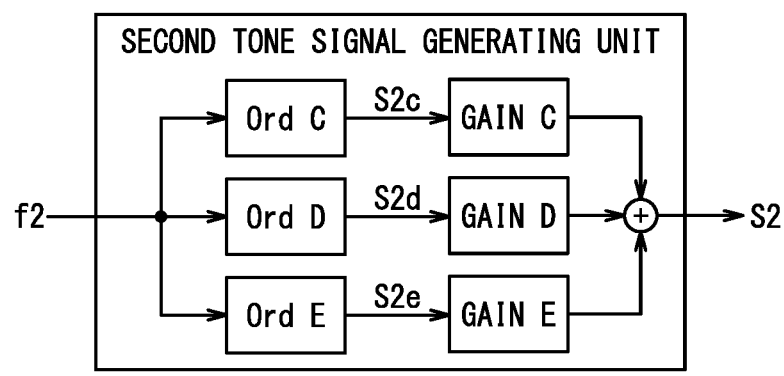
FIG. 5 is a block diagram showing a configuration of a second tone signal generating unit.

FIG. 5 is a block diagram showing a configuration of the second tone signal generating unit 28. The second tone signal generating unit 28 generates three frequency components S2c, S2d, and S2e for the sub-fundamental frequency f2. Further, the second tone signal generating unit 28 generates the second tone signal S2 by adding the frequency components S2c, S2d, and S2e, each of which has been multiplied by the gain. The frequency component S2c is the c-th (=1) order component for the sub-fundamental frequency f2. The frequency component S2d is the d-th (=α) order component for the sub-fundamental frequency f2. The frequency component S2e is the e-th (=$\alpha^2$) order component for the sub-fundamental frequency f2. When α=2, the sound of the second tone signal S2 can be harmonized, in a similar manner to the sound of the first tone signal S1.

Figure 6:
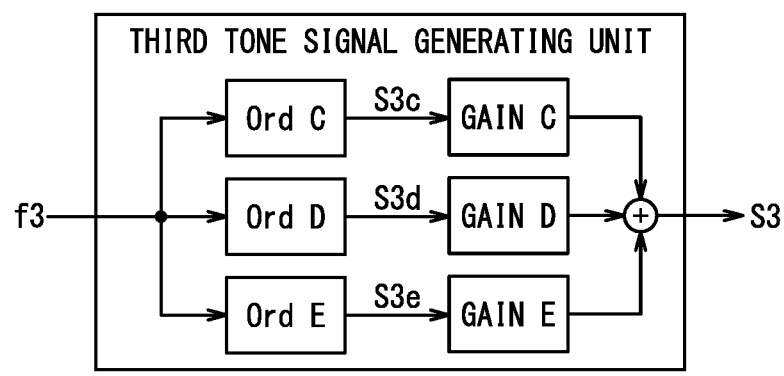
FIG. 6 is a block diagram showing a configuration of a third tone signal generating unit.

FIG. 6 is a block diagram showing the configuration of the third tone signal generating unit 30. The third tone signal generating unit 30 generates three frequency components S3c, S3d, and S3e for the sub-fundamental frequency component f3. Further, the third tone signal generating unit 30 generates third tone signal S3 by adding the frequency components S3c, S3d, and S3e, each of which has been multiplied by the gain. The frequency component S3c is the c-th (=1) order component for the sub-fundamental frequency f3. The frequency component S3d is the d-th (=α) order component for the sub-fundamental frequency f3. The frequency component S3e is the e-th (=$\alpha^2$) order component for the sub-fundamental frequency f3. When α=2, the sound of the third tone signal S3 can be harmonized, in a similar manner to the sound of the first tone signal S1.

Figure 7:
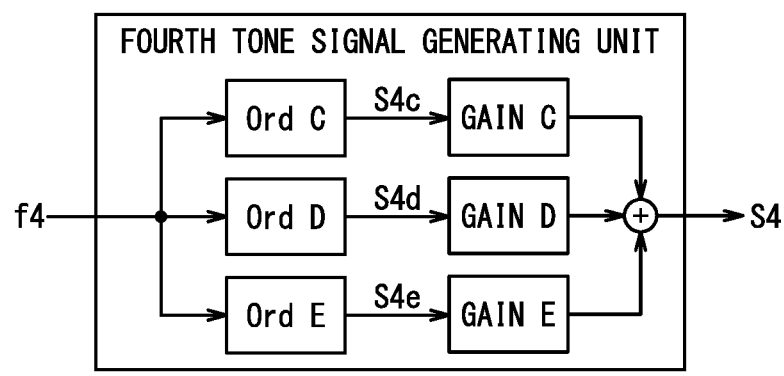
FIG. 7 is a block diagram showing the configuration of a fourth tone signal generating unit.

FIG. 7 is a block diagram showing a configuration of the fourth tone signal generating unit 32. The fourth tone signal generating unit 32 generates three frequency components S4c, S4d, and S4e for the sub-fundamental frequency component f4. Further, the fourth tone signal generating unit 32 generates the fourth tone signal S4 by adding the frequency components S4c, S4d, and S4e, each of which has been multiplied by the gain. The frequency component S4c are the c-th (=1) order component for the sub-fundamental frequency f4. The frequency component S4$d$ is the d-th (=α) order component for the sub-fundamental frequency f4. The frequency component S4$e$ is the e-th (=α^2) order component for the sub-fundamental frequency f4. When α=2, the sound of the fourth tone signal S4 can be harmonized, in a similar manner to the sound of the first tone signal S1.

The active sound effect generating device 10 of the present embodiment includes four tone signal generating units, namely, the first tone signal generating unit 26, the second tone signal generating unit 28, the third tone signal generating unit 30, and the fourth tone signal generating unit 32. The number of tone signal generating units need not necessarily be four. The number of tone signal generating units may be the same as the number of sub-fundamental frequencies generated by the tone adjusting unit 24.

In the active sound effect generating device 10 of the present embodiment, the first tone signal generating unit 26 generates three frequency components S1$c$, S1$d$, and S1$e$. The first tone signal generating unit 26 may generate two frequency components. The first tone signal generating unit 26 may generate four or more frequency components.

The second tone signal generating unit 28 generates three frequency components S2$c$, S2$d$, and S2$e$. The second tone signal generating unit 28 may generate two frequency components. The second tone signal generating unit 28 may generate four or more frequency components.

The third tone signal generating unit 30 generates three frequency components S3$c$, S3$d$, and S3$e$. The third tone signal generating unit 30 may generate two frequency components. The third tone signal generating unit 30 may generate four or more frequency components.

The fourth tone signal generating unit 32 generates three frequency components S4$c$, S4$d$, and S4$e$. The fourth tone signal generating unit 32 may generate two frequency components. The fourth tone signal generating unit 32 may generate four or more frequency components.

Figure 8:
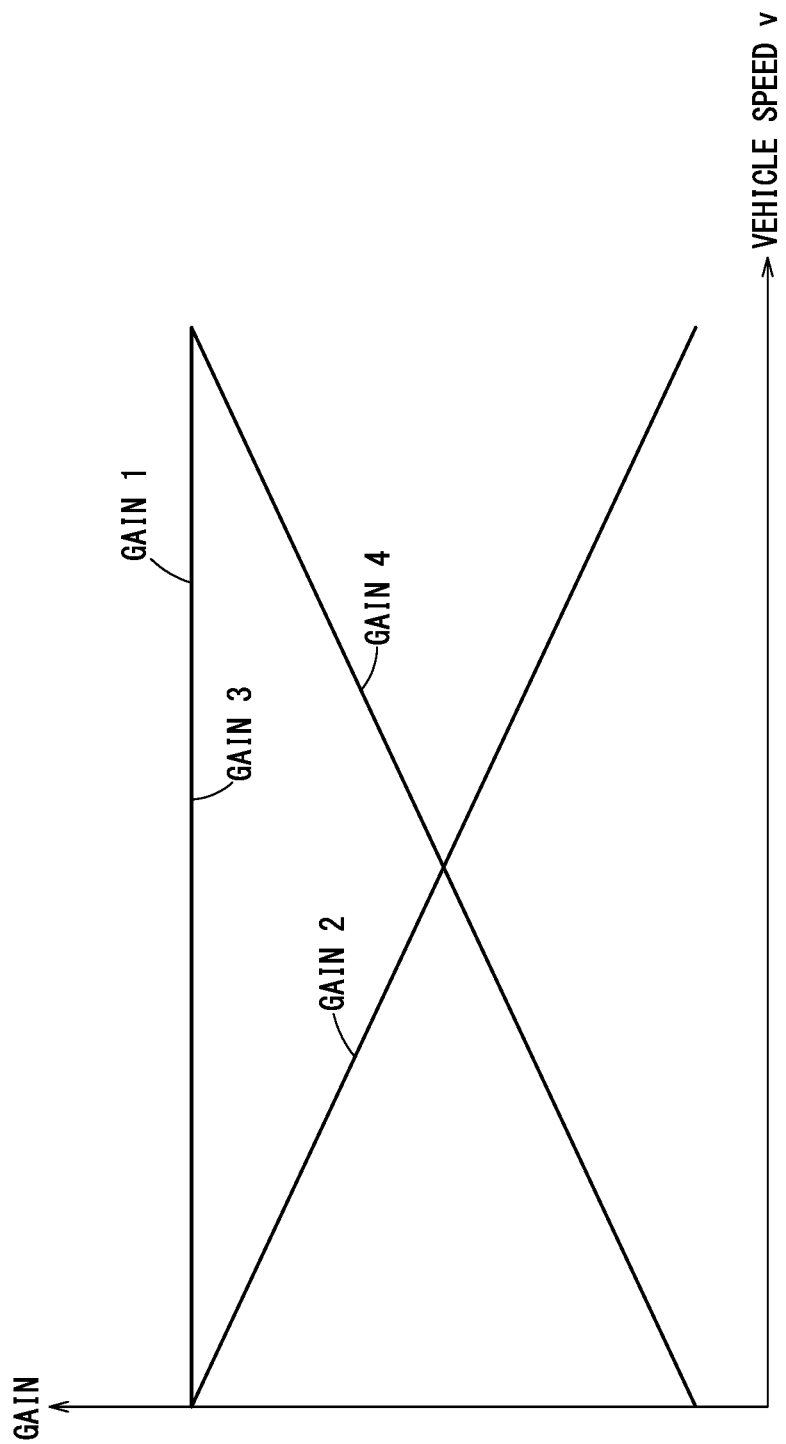
FIG. 8 is a map of the gain of each tone signal.

The tone signal gain adjusting unit 34 adjusts gains by which the first tone signal S1, the second tone signal S2, the third tone signal S3, and the fourth tone signal S4 are multiplied. Hereinafter, the gain for the first tone signal S1 may be referred to as a gain 1. The gain for the second tone signal S2 may be referred to as a gain 2. The gain for the third tone signal S3 may be referred to as a gain 3. The gain for the fourth tone signal S4 may be referred to as a gain 4. FIG. 8 is a map of the gain 1, the gain 2, the gain 3, and the gain 4. As shown in FIG. 8, the gains 1 and 3 are constant values regardless of the vehicle speed v. The gain 2 decreases as the vehicle speed v becomes higher. The maximum value of the gain 2 is equal to the value of the gain 1 and the gain 3. The gain 4 increases as the vehicle speed v increases. The maximum value of the gain 4 is equal to the value of the gain 1 and the gain 3.

As a result, when the vehicle speed v is low, the sound effect output from the speaker 12 includes a lot of the first tone signal S1, the second tone signal S2, and the third tone signal S3. The ratio of the fundamental frequency (sub-fundamental frequency f1) of the first tone signal S1, the fundamental frequency (sub-fundamental frequency f2) of the second tone signal S2, and the fundamental frequency (sub-fundamental frequency f3) of the third tone signal S3 is r1:r2:r3=1:1.25:1.5. As a result, the sound effect becomes a bright resonance of the major chord.

On the other hand, when the vehicle speed v is high, the sound effect output from the speaker 12 includes a lot of the first tone signal S1, the fourth tone signal S4, and the third tone signal S3. The ratio of the fundamental frequency of the first tone signal S1 (sub-fundamental frequency f1), the fourth tone signal S4 (sub-fundamental frequency f4), and the third tone signal S3 (sub-fundamental frequency f3) is r1:r4:r3=1:1.2:1.5. As a result, the sound effect becomes a fantastic sound of the minor chord.

The sound effect signal generating unit 36 generates a sound effect signal S by adding a first tone signal S1', a second tone signal S2', a third tone signals S3', and the fourth tone signal S4'. The first tone signal S1', the second tone signal S2', the third tone signal S3', and the fourth tone signal S4' are signals, each of which has been multiplied by the gain adjusted by the tone signal gain adjusting unit 34.

Figure 9:
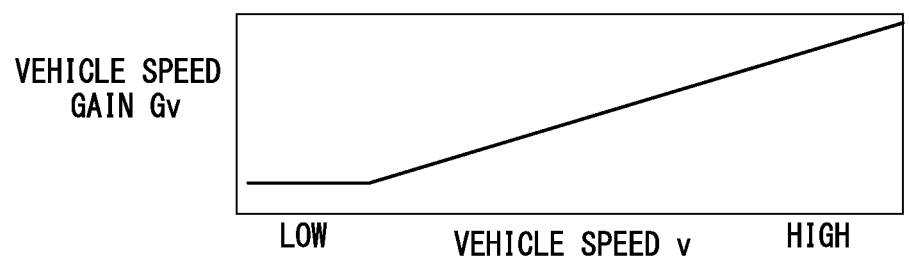
FIG. 9 is a vehicle speed gain map.

The vehicle speed gain setting unit 38 sets a vehicle speed gain Gv. FIG. 9 is a vehicle speed gain map. The vehicle speed gain Gv is a constant value regardless of the vehicle speed v in a low vehicle speed region. The vehicle speed gain Gv increases linearly as the vehicle speed v increases in a middle vehicle speed region and a high vehicle speed region.

Figure 10:
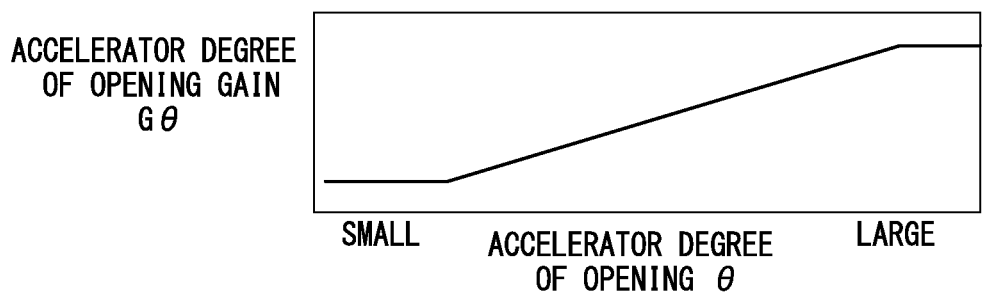
FIG. 10 is an accelerator degree of opening gain map.

The accelerator degree of opening gain setting unit 40 sets an accelerator degree of opening gain Gθ. FIG. 10 is an accelerator degree of opening gain map. The accelerator degree of opening gain Gθ is a constant value regardless of the accelerator degree of opening θ in a small degree of opening region of the accelerator degree of opening θ. The accelerator degree of opening gain Gθ increases linearly as the accelerator degree of opening θ increases from a middle degree of opening region to a large degree of opening region. The accelerator degree of opening gain Gθ is a constant value regardless of the accelerator degree of opening θ in the large degree of opening region of the accelerator degree of opening θ.

Figure 11:
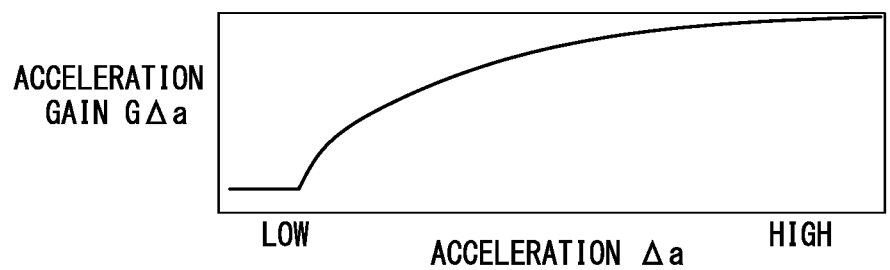
FIG. 11 is an acceleration gain map.

The acceleration gain setting unit 42 sets an acceleration gain GΔa. FIG. 11 is an acceleration gain map. The acceleration gain GΔa is a constant value regardless of the acceleration Aa in a low acceleration region. In a middle acceleration region and a high acceleration region, the acceleration gain GΔa increases logarithmically as the acceleration Aa increases.

The sound effect signal amplifying unit 44 multiplies the sound effect signal S by the gain G to output the sound effect signal S'. The gain G is obtained from the vehicle speed gain Gv, the accelerator degree of opening gain Gθ, and the acceleration gain GΔa by the following expression:

$$G=Gv \times G\theta + G\Delta a$$

The sound effect signal S' is converted into an analog signal by a digital-to-analog converter (not shown) and output to the speaker 12. A sound effect corresponding to the sound effect signal S' is output from the speaker 12 into a vehicle compartment.

Advantageous Effects

The first tone signal S1 generated by the first tone signal generating unit 26 of the active sound effect generating device 10 includes frequency components having c-th, d-th, and e-th order tone signals. The second tone signal S2 generated by the second tone signal generating unit 28 includes frequency components having c-th, d-th, and e-th order tone signals. The third tone signal S3 generated by the third tone signal generating unit 30 includes frequency components having c-th, d-th, and e-th order tone signals. The fourth tone signal S4 generated by the fourth tone signal generating unit 32 includes frequency components having c-th, d-th, and e-th order tone signals.

The d-th order is α times the c-th order, and the e-th order is α times the d-th order. That is, the first tone signal S1, the second tone signal S2, the third tone signal S3, and the fourth tone signal S4 have the same order of frequency components. The ratio of the order is also constant at α. In order to harmonize the sound effect output from the speaker 12, the value α is often set to 2 (α=2). Therefore, only by adjusting the orders of the frequency components of the first tone signal S1, the second tone signal S2, the third tone signal S3, and the fourth tone signal S4, the degrees of freedom of tone color adjustment of the sound effect are low. As a result, a sound effect specific to each vehicle type cannot be generated. In addition, a sound effect symbolizing a brand cannot be generated.

Thus, in the active sound effect generating device 10 according to the present embodiment, the tone adjusting unit 24 generates the sub-fundamental frequencies f1, f2, f3, and f4. The sub-fundamental frequencies f1, f2, f3, and f4 are generated by multiplying the fundamental frequency f0 by the tone setting coefficients r1, r2, r3, and r4, respectively. The first tone signal generating unit 26 generates the first tone signal f1 based on the sub-fundamental frequency S1. The second tone signal generating unit 28 generates the second tone signal f2 based on the sub-fundamental frequency S2. The third tone signal generating unit 30 generates the third tone signals f3 based on the sub-fundamental frequency S3. The fourth tone signal generating unit 32 generates the fourth tone signals f4 based on the sub-fundamental frequency S4. The sound effect signal generating unit 36 generates the sound effect signal S based on the first tone signal S1, the second tone signal S2, the third tone signal S3, and the fourth tone signal S4.

Thus, by arbitrarily setting the tone setting coefficients r1, r2, r3, and r4 used in the tone adjusting unit 24, a sound effect of an arbitrary tone can be realized.

In the active sound effect generating device 10 according to the present embodiment, the first tone signal S1 generated by the first tone signal generating unit 26 includes the frequency components S1c, S1d, and S1e. The frequency component S1c is the c-th order component for the sub-fundamental frequency component f1. The frequency component S1d is the d-th order component for the sub-fundamental frequency f1. The frequency component S1e is the e-th order component for the sub-fundamental frequency component f1. The d-th order is α times the c-th order, and the e-th order is α times the d-th order. By setting α=2, the sound of the first tone signal S1 can be harmonized.

In the active sound effect generating device 10 according to the present embodiment, the second tone signal S2 generated by the second tone signal generating unit 28 includes the frequency components S2c, S2d, and S2e. The frequency component S2c is the c-th order component for the sub-fundamental frequency f2. The frequency component S2d is the d-th order component for the sub-fundamental frequency f2. The frequency component S2e is the e-th order component for the sub-fundamental frequency component f2. The d-th order is α times the c-th order, and the e-th order is α times the d-th order. By setting α=2, the sound of the second tone signal S2 can be harmonized.

In the active sound effect generating device 10 according to the present embodiment, the third tone signal S3 generated by the third tone signal generating unit 30 includes the frequency components S3c, S3d, and S3e. The frequency component S3c is the c-th order component for the sub-fundamental frequency f3. The frequency component S3d is the d-th order component for the sub-fundamental frequency f3. The frequency component S3e is the e-th order component for the sub-fundamental frequency component f3. The d-th order is α times the c-th order, and the e-th order is α times the d-th order. By setting α=2, the sound of the third tone signal S3 can be harmonized.

In the active sound effect generating device 10 according to the present embodiment, the fourth tone signal S4 generated by the fourth tone signal generating unit 32 includes the frequency components S4c, S4d, and S4e. The frequency component S4c is the c-th order component for the sub-fundamental frequency f4. The frequency component S4d is the d-th order component for the sub-fundamental frequency f4. The frequency component S4e is the e-th order component for the sub-fundamental frequency component f4. The d-th order is α times the c-th order, and the e-th order is α times the d-th order. By setting α=2, the sound of the fourth tone signal S4 can be harmonized.

In this embodiment, the tone signal gain adjusting unit 34 adjusts gains to be multiplied by the first tone signal S1, the second tone signal S2, the third tone signal S3, and the fourth tone signal S4, in accordance with the vehicle speed v. More specifically, in the present embodiment, the tone signal gain adjusting unit 34 adjusts the gain of the second tone signal S2 to be a smaller value as the vehicle speed v increases, and adjusts the gain of the fourth tone signal S4 to be a larger value as the vehicle speed v increases. As a result, the tone of the sound effect can be switched according to the vehicle speed v.

Further, in the present embodiment, the fundamental frequency setting unit 22 sets the fundamental frequency f0 so as to repeatedly increase exponentially from the lower limit frequency Fmin to the upper limit frequency Fmax in accordance with an increase in the vehicle speed v. As a result, sound effects corresponding to the vehicle speed v and the acceleration Aa can be generated from the speaker 12 using only sounds of frequencies within a certain frequency range.

Second Embodiment

In the first embodiment, the fundamental frequency setting unit 22 sets the fundamental frequency f0 so as to increase exponentially as the vehicle speed v increases. On the other hand, the fundamental frequency setting unit 22 may set the fundamental frequency f0 so as to increase linearly as the vehicle speed v increases.

Figure 12:
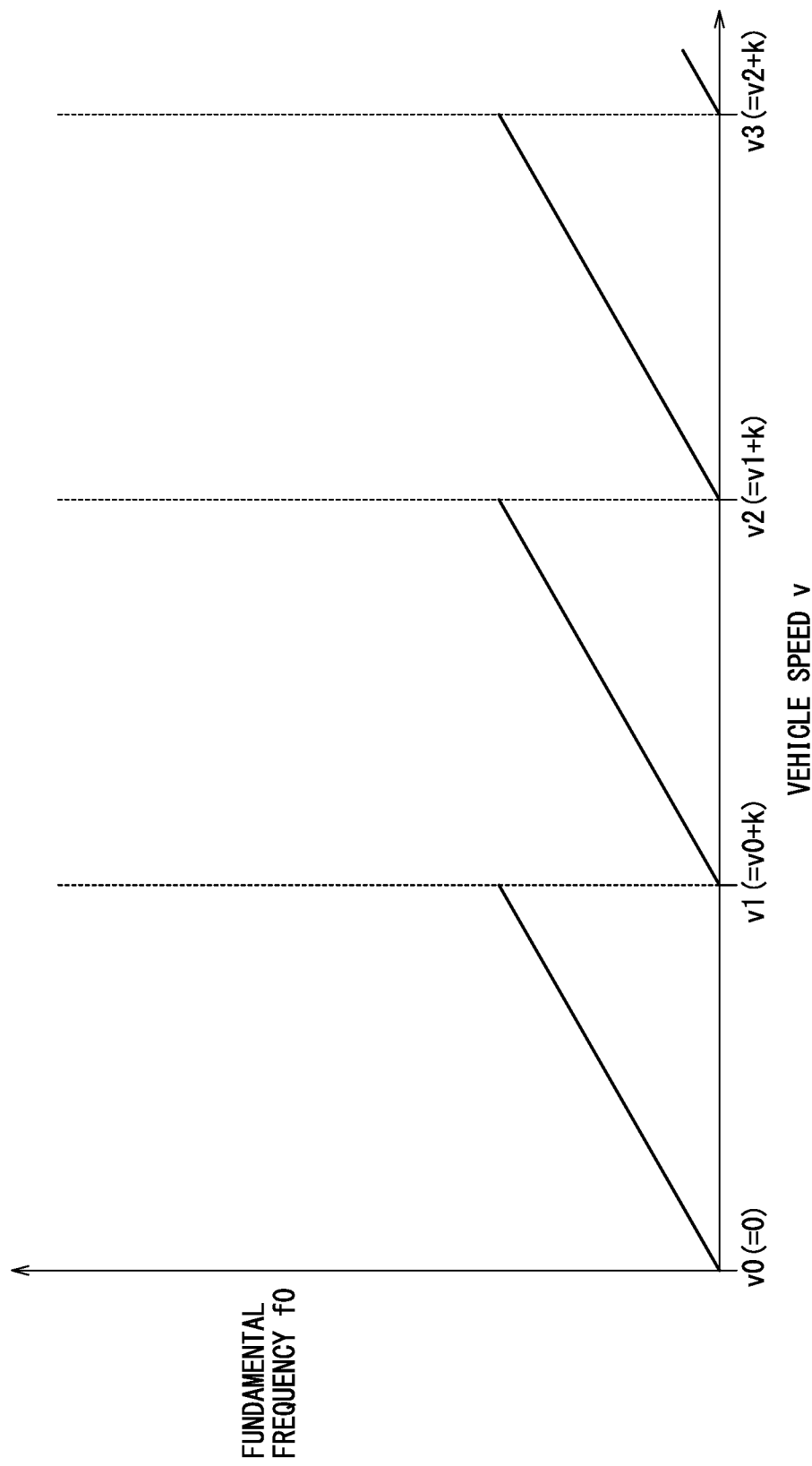
FIG. 12 is a graph showing the fundamental frequency with respect to the vehicle speed.

FIG. 12 is a graph showing the fundamental frequency f0 with respect to the vehicle speed v. As shown in FIG. 12, the fundamental frequency f0 is set so as to increase linearly as the vehicle speed v increases. When the vehicle speed v reaches a predetermined vehicle speed (v1, v2, v3 . . . ), the fundamental frequency f0 is set to 0. Then, the fundamental frequency f0 is set so as to increase again linearly as the vehicle speed v increases.

In the present embodiment, the first tone signal generating unit 26 generates three frequency components S1c, S1d, and S1e for the sub-fundamental frequency f1. Further, the first tone signal generating unit 26 generates the first tone signal S1 by adding the frequency components S1c, S1d, and S1e, each of which has been multiplied by the gain. The frequency component S1c is a c-th order component for the sub-fundamental frequency f1. The frequency component S1d is a d-th order component for the sub-fundamental frequency f1. The frequency component S1e is an e-th order component for the sub-fundamental frequency f1. In the present embodiment, the c-th order is a 1-th order, the d-th order is an α-th order, and the e-th order is a 2α-th order.

Figure 13:
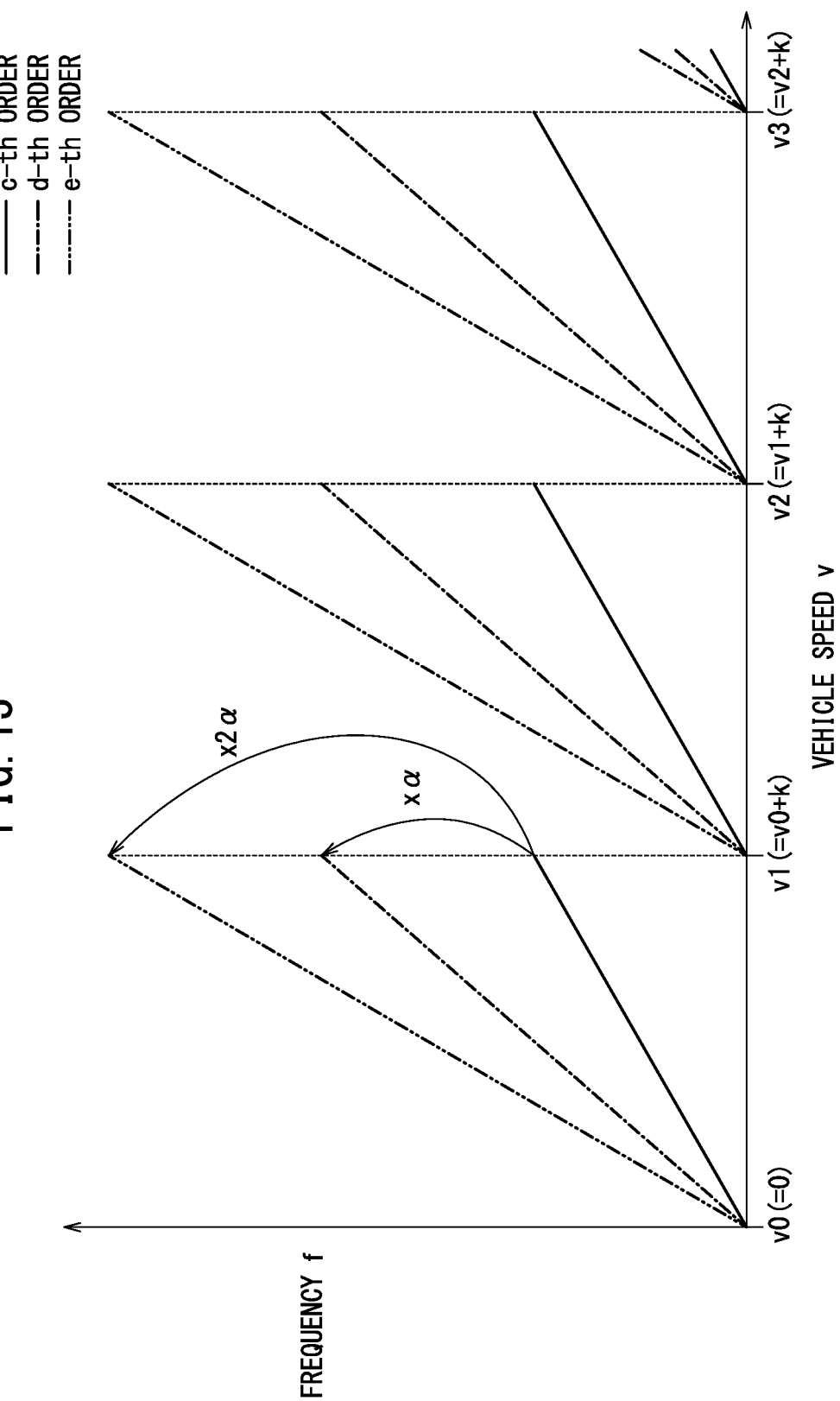
FIG. 13 is a graph showing the change of each ordered frequency with respect to the vehicle speed.

FIG. 13 is a graph showing changes of the c-th, d-th, and e-th frequencies for the sub-fundamental frequency f1, with respect to the vehicle speed v. For example, the d-th order frequency is α times the c-th order frequency, and the e-th order frequency is 2α times the c-th order frequency.

Other Embodiments

The active sound effect generating device 10 of the first embodiment includes four tone signal generating units, namely, the first tone signal generating unit 26, the second tone signal generating unit 28, the third tone signal generating unit 30, and the fourth tone signal generating unit 32. The number of sub-fundamental frequencies f1, f2, f3, and f4 generated by the tone adjusting unit 24 is four. That is, the number of tone signal generation units is equal to the number of sub fundamental frequencies fm. The number of audio signal generating units is not limited to four, but the number of the audio signal generating units may correspond to the number of sub-fundamental frequencies fm.

Further, some of the sub-fundamental frequencies fm from among the plurality of sub-fundamental frequencies fm may be the same frequency. In this case, the number of tone signal generating units that generate a tone signal based on the same sub-fundamental frequency fm is counted as one. For example, when the sub-fundamental frequencies f2 and f4 are the same, the number of the two tone signal generating units, i.e., the second tone signal generating unit 28 and the fourth tone signal generating unit 32, is regarded as one.

Technical Invention Obtained from Embodiments

A description will be given below concerning technical invention that can be grasped from the above-described embodiments.

The active sound effect generating device (10) generates a sound effect in the vehicle compartment of the vehicle, and includes the vehicle speed acquisition unit (14) configured to acquire a vehicle speed, the fundamental frequency setting unit (22) configured to set a fundamental frequency that changes in accordance with the acquired vehicle speed, the tone adjusting unit (24) configured to set a plurality of different sub-fundamental frequencies by multiplying the fundamental frequency by coefficients, the tone signal generating units (26, 28, 30, 32) provided corresponding to the respective sub-fundamental frequencies, and each configured to generate a tone signal including a plurality of ordered frequency components that are obtained by multiplying each of the sub-fundamental frequencies by predetermined values, and the sound effect signal generating unit (36) configured to generate a sound effect signal that causes the speaker (12) to output the sound effect, based on the tone signal generated by each of the tone signal generating units.

The active sound effect generating device according to the present invention may further include the gain adjusting unit (34) configured to set a gain corresponding to the tone signal generated by each of the tone signal generating units in accordance with the vehicle speed, and multiply each of the tone signals by the set gain corresponding to the tone signal to thereby output each of the resultant tone signals.

In the active sound effect generating device according to the present invention, the gain adjusting unit may be configured to set the gain corresponding to at least one of the tone signals so as to increase as the vehicle speed increases, and configured to set the gain corresponding to at least one of the tone signals so as to decrease as the vehicle speed increases.

In the active sound effect generating device according to the present invention, the fundamental frequency setting unit may be configured to set the fundamental frequency between the lower limit frequency and the upper limit frequency, set the fundamental frequency so as to increase exponentially from the lower limit frequency to the upper limit frequency in accordance with an increase in the vehicle speed, and set the fundamental frequency so as to return to the lower limit frequency when the fundamental frequency reaches the upper limit frequency, and so as to increase exponentially from the lower limit frequency to the upper limit frequency again in accordance with the increase in the vehicle speed.

The present invention is not particularly limited to the embodiments described above, and various modifications are possible without departing from the essence and gist of the present invention.

What is claimed is:

1. An active sound effect generating device that generates a sound effect in a vehicle compartment of a vehicle, the active sound effect generating device comprising one or more processors that execute computer-executable instructions stored in a memory, wherein the one or more processors execute the computer-executable instructions to cause the active sound effect generating device to:
   acquire a vehicle speed;
   set a fundamental frequency that changes in accordance with the acquired vehicle speed;
   set a plurality of different sub-fundamental frequencies by multiplying the fundamental frequency by coefficients;
   generate a plurality of different frequency components by multiplying each of the sub-fundamental frequencies by a plurality of different predetermined values;
   generate, for each of the sub-fundamental frequencies, tone signals including a plurality of frequency components by adding the plurality of different frequency components generated from each of the sub-fundamental frequencies together; and
   generate a sound effect signal that causes a speaker to output the sound effect by adding the tone signals generated for each of the sub-fundamental frequencies together.

2. The active sound effect generating device according to claim 1, wherein the one or more processors cause the active sound effect generating device to set a gain corresponding to each of the tone signals in accordance with the vehicle speed, and multiply each of the tone signals by the set gain corresponding to the tone signal to thereby output each of the resultant tone signals.

3. The active sound effect generating device according to claim 2, wherein the one or more processors cause the active sound effect generating device to:
   set the gain corresponding to at least one of the tone signals so as to increase as the vehicle speed increases; and
   set the gain corresponding to at least one of the tone signals so as to decrease as the vehicle speed increases.

4. The active sound effect generating device according to claim 1, wherein the one or more processors cause the active sound effect generating device to:
   set the fundamental frequency between a lower limit frequency and an upper limit frequency;
   set the fundamental frequency so as to increase exponentially from the lower limit frequency to the upper limit frequency in accordance with an increase in the vehicle speed; and
   set the fundamental frequency so as to return to the lower limit frequency when the fundamental frequency reaches the upper limit frequency, and so as to increase exponentially from the lower limit frequency to the upper limit frequency again in accordance with the increase in the vehicle speed.

* * * * *